United States Patent
Katsumoto et al.

(10) Patent No.: US 8,369,630 B2
(45) Date of Patent: Feb. 5, 2013

(54) IMAGE ENCODING DEVICE AND IMAGE ENCODING METHOD WITH DISTANCE INFORMATION

(75) Inventors: Toshiyuki Katsumoto, Tokyo (JP); Nobuhiro Igi, Kanagawa (JP); Hiromasa Watanabe, Tokyo (JP); Yukio Yanagihara, Chiba (JP)

(73) Assignee: Sony Corporation, Tokyo (JP)

( * ) Notice: Subject to any disclaimer, the term of this patent is extended or adjusted under 35 U.S.C. 154(b) by 891 days.

(21) Appl. No.: 12/429,669

(22) Filed: Apr. 24, 2009

(65) Prior Publication Data

US 2009/0304294 A1 Dec. 10, 2009

(30) Foreign Application Priority Data

Jun. 4, 2008 (JP) ................ 2008-147354

(51) Int. Cl.
G06K 9/36 (2006.01)
(52) U.S. Cl. .............. 382/232; 345/690; 348/335
(58) Field of Classification Search .............. 382/232; 345/690; 348/335
See application file for complete search history.

(56) References Cited

U.S. PATENT DOCUMENTS

| | | | | |
|---|---|---|---|---|
| 4,695,130 A | * | 9/1987 | Medina et al. | 359/464 |
| 5,521,695 A | * | 5/1996 | Cathey et al. | 356/4.01 |
| 6,160,579 A | * | 12/2000 | Shiraiwa et al. | 348/224.1 |
| 7,224,382 B2 | * | 5/2007 | Baker | 348/46 |
| 2002/0001398 A1 | * | 1/2002 | Shimano et al. | 382/104 |
| 2002/0096624 A1 | * | 7/2002 | McKee et al. | 250/208.1 |
| 2004/0135780 A1 | | 7/2004 | Nims | |

FOREIGN PATENT DOCUMENTS

| | | |
|---|---|---|
| JP | 8-70473 | 3/1996 |
| JP | 2000-102035 | 4/2000 |
| JP | 2000-227332 | 8/2000 |
| JP | 2000-253422 | 9/2000 |
| JP | 2002-77944 | 3/2002 |
| JP | 2003-125289 | 4/2003 |
| JP | 2004-221700 | 8/2004 |
| JP | 2004-242000 | 8/2004 |
| JP | 2006-105771 | 4/2006 |
| WO | WO 97/24000 A1 | 7/1997 |
| WO | WO 00/28371 A1 | 5/2000 |

* cited by examiner

Primary Examiner — Chan S Park
Assistant Examiner — Eueng-Nan Yeh
(74) Attorney, Agent, or Firm — Oblon, Spivak, McClelland, Maier & Neustadt, L.L.P.

(57) ABSTRACT

An image encoding device includes a single image pickup unit generating image data by shooting a subject, an image compression unit generating digital image data by encoding the image data, a distance measuring unit measuring a distance to the subject during the shooting, and a multiplexing unit generating multiplexed data based on the digital image data and the measured distance by multiplexing distance data indicating the distance to a subject of each of given pixel blocks of the digital image data onto the digital image data.

3 Claims, 6 Drawing Sheets

IMAGE ENCODING DEVICE AND IMAGE ENCODING METHOD WITH DISTANCE INFORMATION

BACKGROUND OF THE INVENTION

1. Field of the Invention

The present invention relates to an image encoding device and an image encoding method that are provided to measure the distance between the image encoding device and a subject when the subject is shot so as to obtain the subject image.

2. Description of the Related Art

Various technologies have been developed to obtain realistic video data. As a method for achieving the realistic video data, the reproduction of a three-dimensional image may be considered. The three-dimensional image is generated, for example, by shooting the same subject from the viewpoint of each of the left eye and the right eye so that two image data items are obtained. At the reproducing time, the left-eye image data can be viewed through the left eye and the right-eye image data can be viewed through the right eye. The image data of a subject shot from the viewpoint of each of the left eye and the right eye is referred to as parallax image data.

According to the simplest method for generating the parallax image data, two cameras are provided at the positions corresponding to the left and right eyes so that two kinds of images are obtained through shooting. According to the above-described method, however, enormous efforts and costs are expended on the shooting. Therefore, a technology for generating three-dimensional image data based on two-dimensional video data obtained through shooting performed by a single camera has been hoped.

When the three-dimensional image data is generated based on a single two-dimensional image, two parallax images should be generated based on a single two-dimensional image data item. In the past, a three-dimensional image generating system configured to generate two parallax images based on a single two-dimensional image used distance information indicating the distance between the three-dimensional image generating system and each of subject images shown in the two-dimensional image data. The distance information is obtained, for example, through a person viewing an image and estimating the distance between a viewpoint (the camera position) defined at the image-data-generation time and the subject. However, since the distance information is estimated by the person in the above-described example, it has been difficult to automate the above-described steps.

Therefore, a technology for automatically measuring the distance between the system and the subject during the generation of a two-dimensional image has been hoped. Japanese Unexamined Patent Application Publication No. 08-70473 discloses the technology for automatically measuring the distance to a subject and adding the distance information to data of a single two-dimensional image during the generation of the two-dimensional image data.

SUMMARY OF THE INVENTION

As described above, Japanese Unexamined Patent Application Publication No. 08-70473 discloses a communication method used for a stereoscopic image, which is achieved by using information about a measured distance, where the distance information can be embedded in two-dimensional image data in pixels. However, the above-described method has the following disadvantages. Namely, since distance information items are associated with the individual pixels and embedded in the two-dimensional image data, the size of the distance information is increased so that the amount of the two-dimensional image data is increased. Further, since the distance measurement is performed in pixels, the load of distance measuring processing is increased. Therefore, it has been difficult to use the above-described communication method for video shooting.

For eliminating the above-described disadvantages, the present invention provides an image encoding device and an image encoding method that can easily obtain the distance information and easily manage the distance information and image data.

For eliminating the above-described disadvantages, an image encoding device according to an embodiment of the present invention includes a single image pickup unit configured to generate image data by shooting at least one subject, an image compression unit configured to generate digital image data by encoding the generated image data, a distance measuring unit configured to measure a distance to the subject when the image pickup unit performs the shooting, and a multiplexing unit configured to generate multiplexed data based on the digital image data and the measured distance by multiplexing distance data indicating a distance to a subject of each of given pixel blocks of the digital image data onto the digital image data.

An image encoding method according to another embodiment of the present invention includes the steps of generating image data by shooting at least one subject by using a single image pickup unit, generating digital image data by encoding the generated image data, measuring a distance to the subject when the image pickup unit performs the shooting at the image-data generating step, and multiplexing distance data indicating a distance to a subject of each of given pixel blocks of the digital image data onto the digital image data based on the digital image data encoded and generated at the digital-image-data generating step and the distance measured at the measuring step.

The present invention provides an image encoding device and an image encoding method that can easily obtain distance information and easily manage the distance information and image data.

DESCRIPTION OF THE PREFERRED EMBODIMENTS

Figure 1:
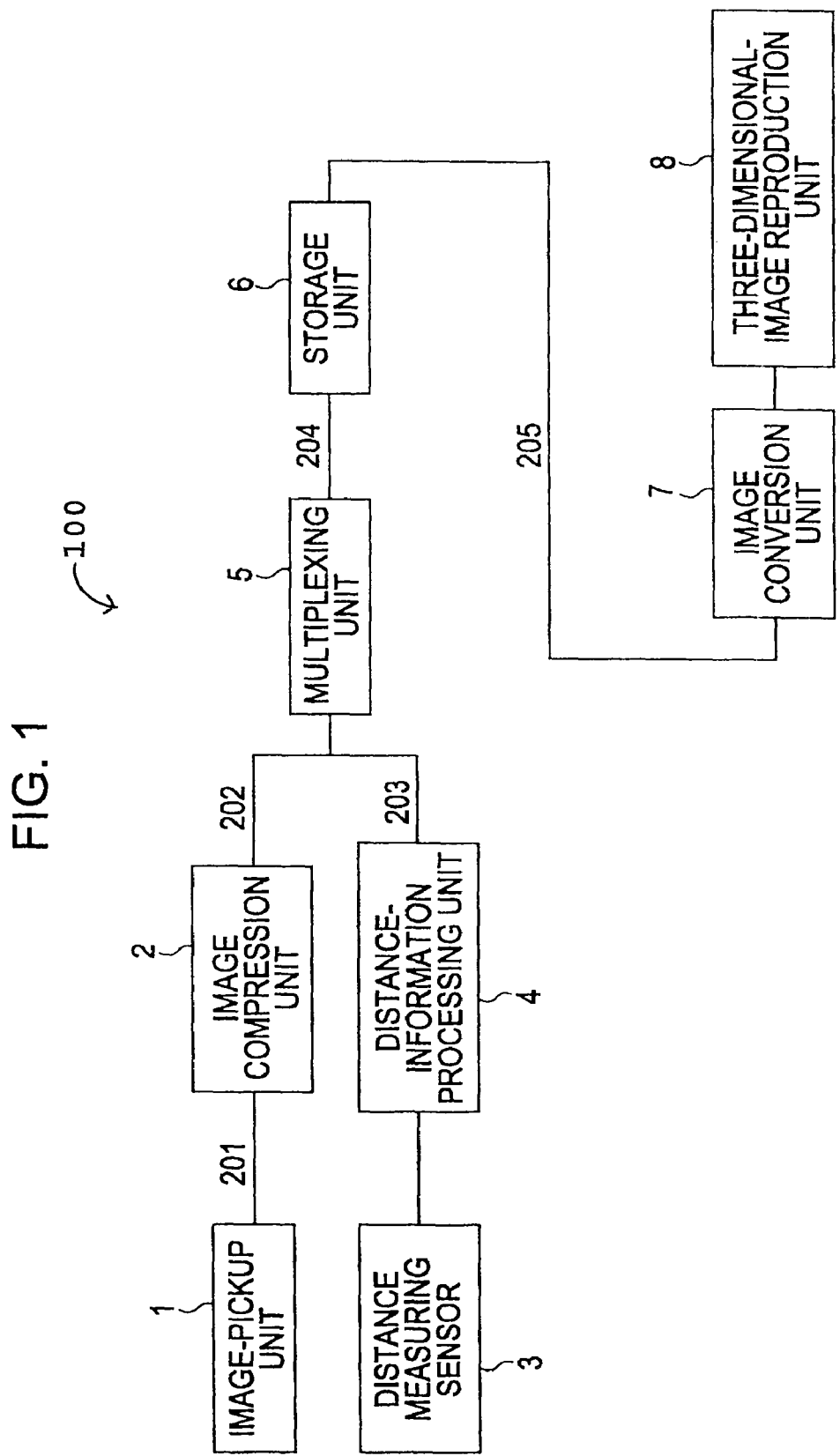
FIG. 1 is a block diagram showing an exemplary configuration of a three-dimensional image generating system according to an embodiment of the present invention.

Hereinafter, embodiments of the present invention will be described. FIG. 1 is a block diagram showing an exemplary configuration of a three-dimensional image generating system 100 according to an embodiment of the present invention. As shown in FIG. 1, the above-described three-dimensional image generating system 100 includes an image pickup unit 1 (corresponding to an image pickup unit according to an embodiment of the present invention), an image compression unit 2 (corresponding to an image compression unit according to an embodiment of the present invention), a distance measuring sensor 3 (corresponding to a distance measuring unit according to an embodiment of the present invention), a distance information processing unit 4, a multiplexing unit 5 (corresponding to a multiplexing unit according to an embodiment of the present invention), a storage unit 6, an image conversion unit 7 (corresponding to an image conversion unit according to an embodiment of the present invention), and a three-dimensional image reproducing unit 8.

The image pickup unit 1 is a part including, for example, a digital still camera, digital video camera, etc., which is configured to shoot a subject and generate image data 201. The image compression unit 2 compresses and converts the image data 201 picked up by the image pickup unit 1 into digital image data 202. The image compression unit 2 may use, for example, Moving Picture Experts Group phase 1 (MPEG1), MPEG2, MPEG4, "DivX (Registered Trademark of Divx, Inc.)", Xvid, WMV9, and so forth, as the image compression technology.

The distance measuring sensor 3 measures the distance between the three-dimensional image generating system 100 and a subject while the image-pickup unit 1 is shooting the subject. The distance measuring sensor 3 exemplarily measures the distance between the three-dimensional image generating system 100 and a subject of which image is obtained through a pixel extracted from each of given pixel blocks of pixels provided in the image pickup unit 1. The distance measuring sensor 3 measures distances through infrared rays and/or ultrasonic waves, for example.

Here, a macroblock (16 by 16 pixels) and/or a block (8 by 8 pixels) obtained through MPEG1 and/or MPEG2 may correspond to the above-described given pixel block, for example. Namely, when the distance measurement is performed for each macroblock, a single distance measuring sensor 3 may be provided for every sixteen pixels of the image pickup unit 1 so that the distance measuring sensor 3 measures the distance between the system and the subject for every sixteen pixels.

Namely, for example, the distance measuring sensors 3 of the same number as the macroblocks of the digital image data that is picked up by the image pickup unit 1 and that is compressed by the image compression unit 2 may be provided, and a plurality of the distance measuring sensors 3 may be provided in a matrix so that the distance measuring sensors 3 correspond to the individual macroblocks. Consequently, it becomes possible to correct the distance data of a predetermined block by correlating the above-described distance data with those of blocks surrounding the predetermined block.

The distance information processing unit 4 generates distance data 23 based on information about a distance measured by the distance measuring sensor 3. The distance data 203 is generated through the distance information processing unit 4 for each given pixel block of the digital image data 202 generated through the image compression unit 2.

The multiplexing unit 5 multiplexes the digital image data 202 generated through the image compression unit 2 and the distance data 203 generated through the distance information processing unit 4 so that multiplexed data 204 is generated. Namely, in a given pixel block of the digital image data 202, the distance data 203 corresponding to the given pixel block is embedded so that the multiplexed data 204 is obtained.

The storage unit 6 is a memory provided to store the multiplexed data 204 generated through the multiplexing unit 5. The image conversion unit 7 reads the multiplexed data 204 stored in the storage unit 6 and generates three-dimensional image data 205 based on the distance data 203 embedded for each given pixel block. The three-dimensional image data 205 generated through the image conversion unit 7 is reproduced through the three-dimensional image reproducing unit 8. The reproduced three-dimensional image data 205 is displayed on a monitor device (including a liquid-crystal display or the like) which is not shown, for example.

Figure 2:
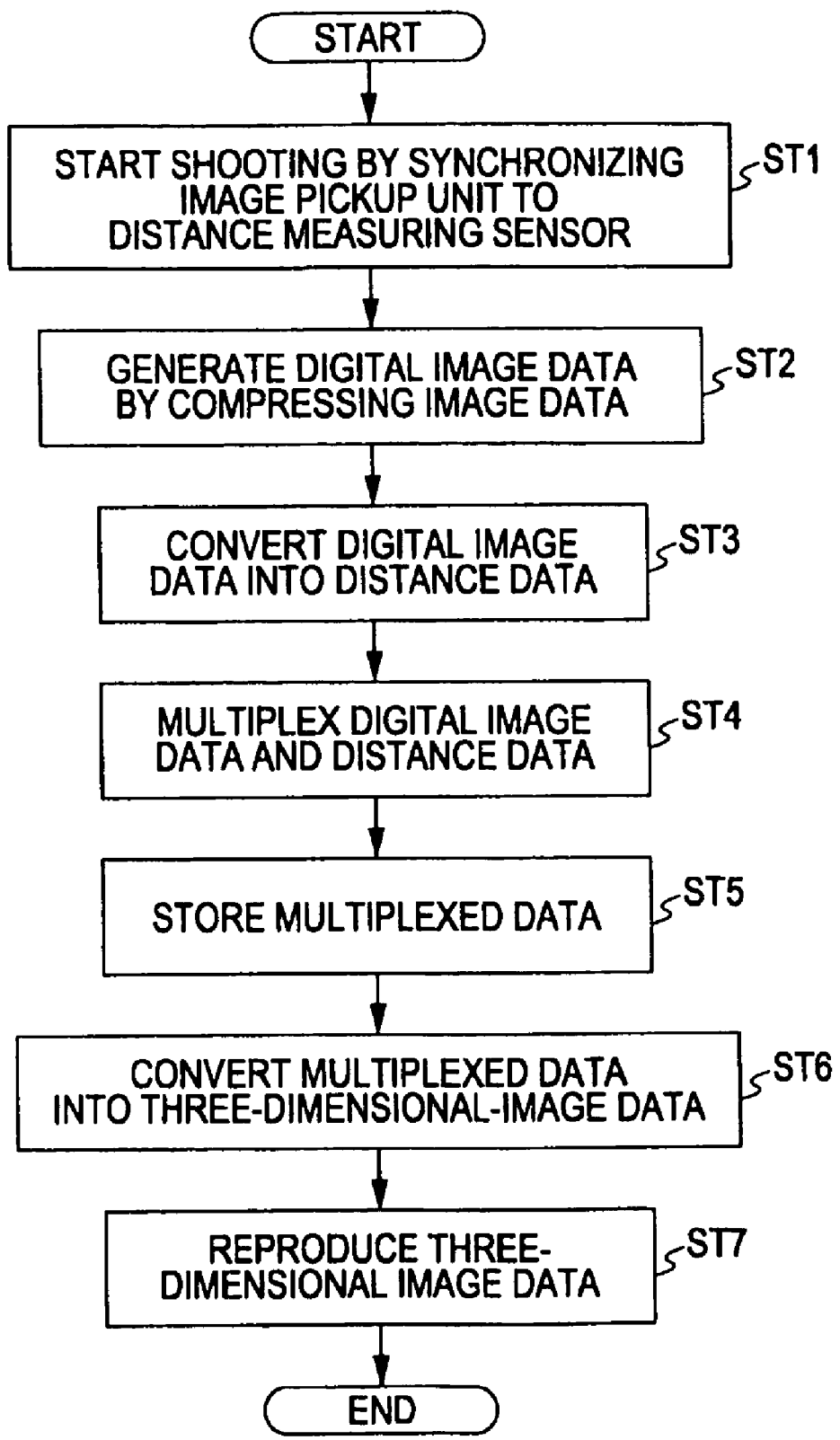
FIG. 2 is a flowchart provided to illustrate exemplary operations performed to generate a three-dimensional image in the above-described three-dimensional image generating system.

Next, exemplary operations performed to generate a three-dimensional image in the above-described three-dimensional image generating system 100 will be described. FIG. 2 is a flowchart illustrating the above-described exemplary operations.

Step ST1: The image pickup unit 1 shoots a subject and generates image data. At the same time, the distance measuring sensor 3 measures the distance between the three-dimensional image generating system 100 and the subject.

Step ST2: The image compression unit 2 compresses the image data generated through the image pickup unit 1 at step ST1 and generates the digital image data 202.

Step ST3: The distance information processing unit 4 converts data of the distance measured through the distance measuring sensor 3 at step ST1 into the distance data 203.

Step ST4: The multiplexing unit 5 multiplexes the digital image data 202 generated at step ST2 and the distance data 203 converted at step ST3 for each given pixel block and each frame of the digital image data 202, and generates the multiplexed data 204. According to a method for multiplexing the above-described data, the distance data 203 may be embedded in the header part or the like of the digital image data 202, for example.

Step ST5: The storage unit 6 stores the multiplexed data 204 generated at step ST4.

Step ST6: The image conversion unit 7 converts the multiplexed data 204 stored in the storage unit 6 at step ST5 into the three-dimensional image data 205. A method for achieving the above-described conversion will be described later in detail.

Step ST7: The three-dimensional image reproducing unit 8 reproduces the three-dimensional image data 205 converted at step ST6 based on operations performed by a user, for example.

Thus, in the above-described three-dimensional image generating system 100, the distance data 203 obtained through the distance measuring sensors 3 corresponding to the individual given pixel blocks of the digital image data 202 is multiplexed onto the digital image data 202 obtained through the image compression unit 2 compressing the image data 201 obtained through the shooting performed by the image pickup unit 1. Therefore, when shooting is performed and two-dimensional image data is obtained, information about the distance between the three-dimensional image generating system 100 and the subject is automatically multiplexed onto the two-dimensional image data so that the multiplexed data 204 is generated. Consequently, a person may not manually input data of the distance between the three-dimensional image generating system 100 and the subject.

Figure 3:
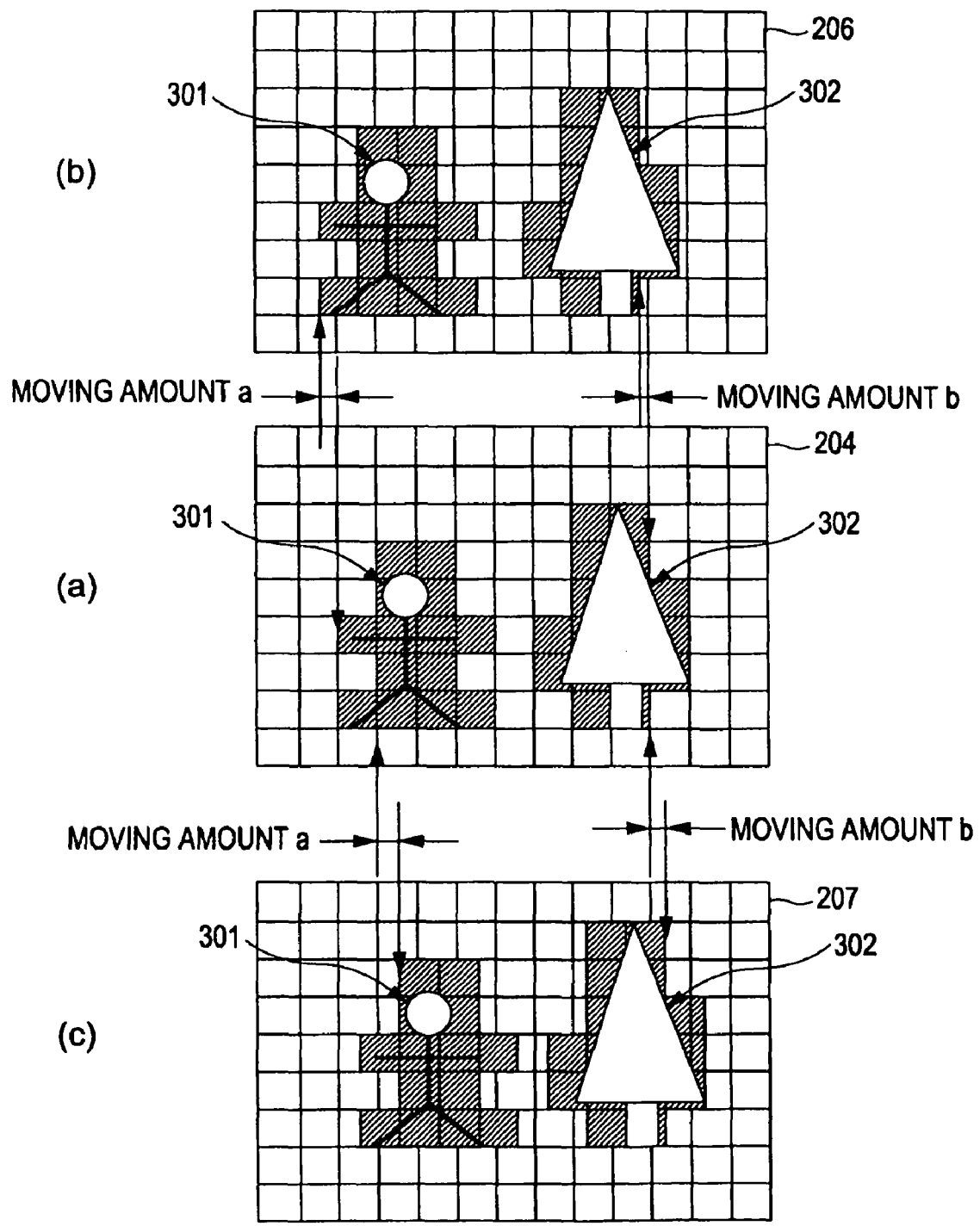
FIG. 3 shows how an image conversion unit converts multiplexed data into data of two parallax images (three-dimensional image data)

Next, a method performed through the image conversion unit 7 so as to convert the multiplexed data 204 into the three-dimensional image data 205 based on the distance data 203 obtained for each given pixel block will be described. FIG. 3 shows an example where the image conversion unit 7 converts the multiplexed data 204 into data of two parallax images (three-dimensional image data 205).

Part (a) of FIG. 3 shows the multiplexed data 204 which is not yet subjected to the conversion, Part (b) of FIG. 3 shows one of the two parallax images obtained through the conversion, which is an image viewed through the right eye (right-eye image data 206), and Part (c) of FIG. 3 shows the other of the two parallax images obtained through the conversion, which is an image viewed through left eye (left-eye image data 207). Here, the multiplexed data 204 shown in Part (a) of FIG. 3 is the digital image data 202 in which the distance data 203 is embedded. However, since the distance data 203 is viewed with difficulty, only the image data is shown in Part (a) of FIG. 3.

As shown in Parts (a), (b), and (c) of FIG. 3, each image data is divided into predetermined pixel blocks. The predetermined pixel block corresponds to the above-described given pixel block. Namely, when the digital image data 202 generating the multiplexed data 204 is compressed under MPEG1 or the like, the pixel block corresponds to the macroblock and/or the block.

The image conversion unit 7 generates the right-eye image data 206 and the left-eye image data 207 by horizontally moving the digital image data 202 based on the distance data 203. The amount of the horizontal movement of each subject will be specifically described based on the image data shown in FIG. 3.

The multiplexed data 204 obtained before the conversion, which is shown in Part (a) of FIG. 3, shows the two subjects corresponding to person data 301 and tree data 302. When reference is made to the distance data 203 at that time, for example, the distance between the three-dimensional image generating system 100 and the person data 301 is determined to be a distance A and that between the three-dimensional image generating system 100 and the tree data 302 is determined to be a distance B. In that case, the distance between the three-dimensional image generating system 100 and each of the subjects is obtained by, for example, averaging all of the distance data items 203 provided for the individual given distance blocks of the subject image.

Further, the distance between the three-dimensional image generating system 100 and background data 303 of the multiplexed data 204 obtained before the conversion is determined to be a distance C. The value of the distance C corresponds to the smaller of the value of the distance between the three-dimensional image generating system 100 and the farthest subject shown in a screen image (namely, the largest distance data 203 of the multiplexed data 204), and a predetermined fixed value. Here, in the above-described embodiment, the expression A<B<C holds.

Figure 4:
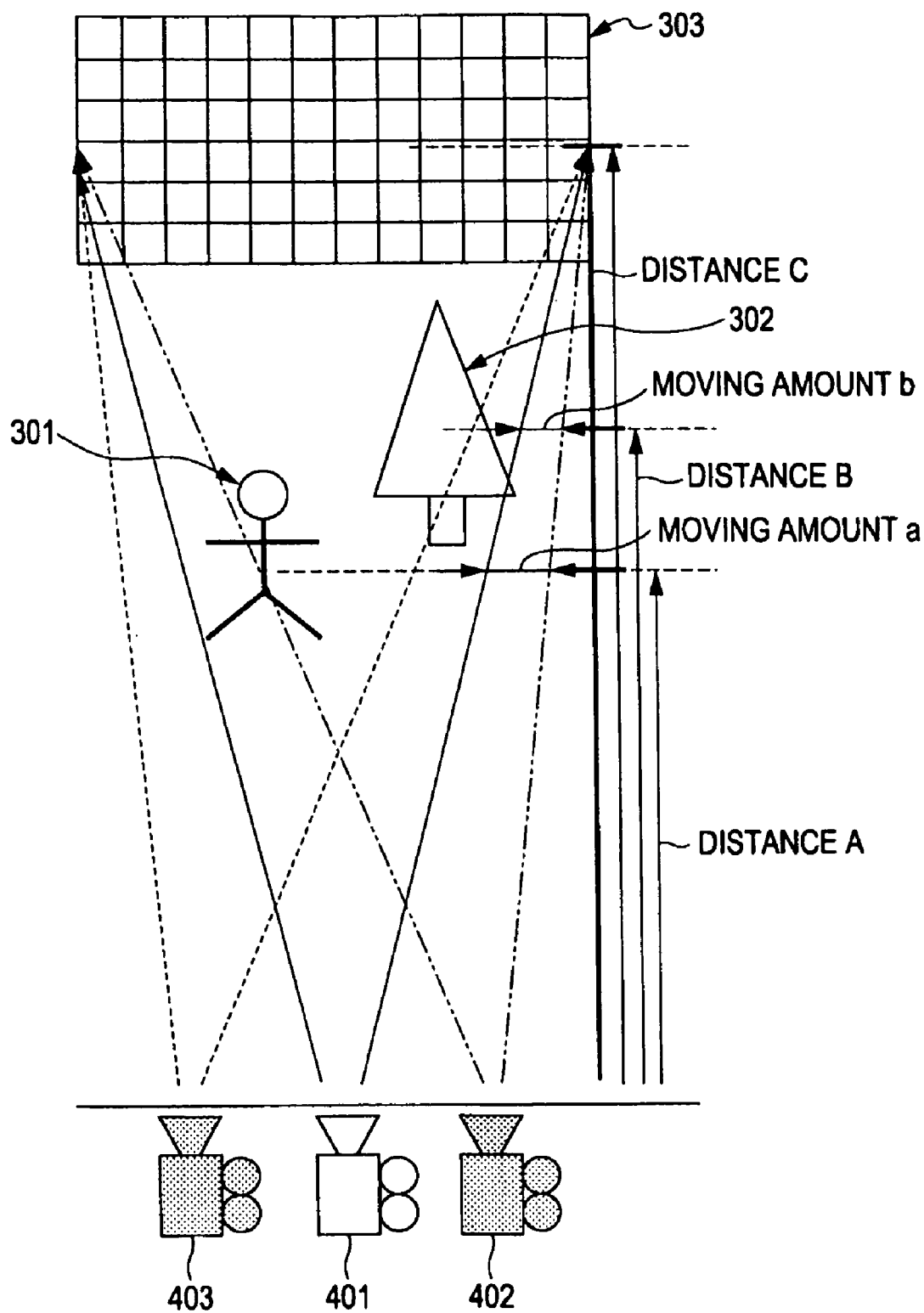
FIG. 4 is a conceptual illustration showing the relationships between image viewpoints and the distances to subjects.

FIG. 4 is a conceptual illustration showing the relationships between image viewpoints and the distances to the subjects. As shown in FIG. 4, an actual viewpoint (the position of the image pickup unit 1) specified when the multiplexed data 204 is generated is determined to be a viewpoint 401, the position of the right eye, the position being specified based on the viewpoint 401, is determined to be a right-eye viewpoint 402, and the position of the left eye, the position being specified based on the viewpoint 401, is determined to be a left-eye viewpoint 403.

The subject viewed from the right-eye viewpoint 402 and/or the left-eye viewpoint 403 is displaced to the left and/or the right, respectively, by as much as the moving amount corresponding to the distance from the viewpoint. Therefore, the right-eye image data 206 can be generated by moving the subject to the left by as much as the moving amount corresponding to the distance between the right-eye viewpoint 402 and the subject. On the contrary, the left-eye image data 207 can be generated by moving the subject to the right by as much as the moving amount corresponding to the distance between the left-eye viewpoint 403 and the subject.

The amount of movement of the subject (the moving amount) is calculated based on the distance between the viewpoint and the subject. For example, a moving amount a of the person data 301, where the distance between the viewpoint and the person data 301 is determined to be A, is exemplarily determined to be (C−A)/C×(predetermined pixel unit) as shown in FIG. 4. Similarly, a moving amount b of the tree data 302, where the distance between the viewpoint and the tree data 302 is determined to be B, is exemplarily determined to be (C−B)/C×(predetermined pixel unit). The above-described moving amounts are obtained when the background is viewed as infinity.

Here, the predetermined pixel unit denotes the value corresponding to the above-described given pixel block. Namely, when the pixel block is the macroblock (16 by 16 pixels), the predetermined pixel unit is determined to be 16 pixels. Namely, the pixels corresponding to one of the sides of the pixel block may be determined to be the predetermined pixel unit.

Thus, the image conversion unit 7 moves each of the subjects to the left by as much as the moving amount calculated according to the above-described method based on the multiplexed data 204 shown in Part (a) of FIG. 3, so that the right-eye image data 206 shown in Part (b) of FIG. 3 can be obtained. Similarly, the image conversion unit 7 moves each of the subjects to the right by as much as the moving amount calculated according to the above-described method based on the multiplexed data 204 shown in Part (a) of FIG. 3, so that the left-eye image data 207 shown in Part (c) of FIG. 3 can be obtained.

Incidentally, when the image conversion unit 7 generates the right-eye image data 206 and/or the left-eye image data 207 by horizontally moving each of the subjects to the right and/or the left as described above, there are no pixels at the original position of each of the subjects even though there should be pixels at the original position. Consequently, a gap occurs at the original position of each of the subjects. The gap is filled according to a method described below.

Figure 5:
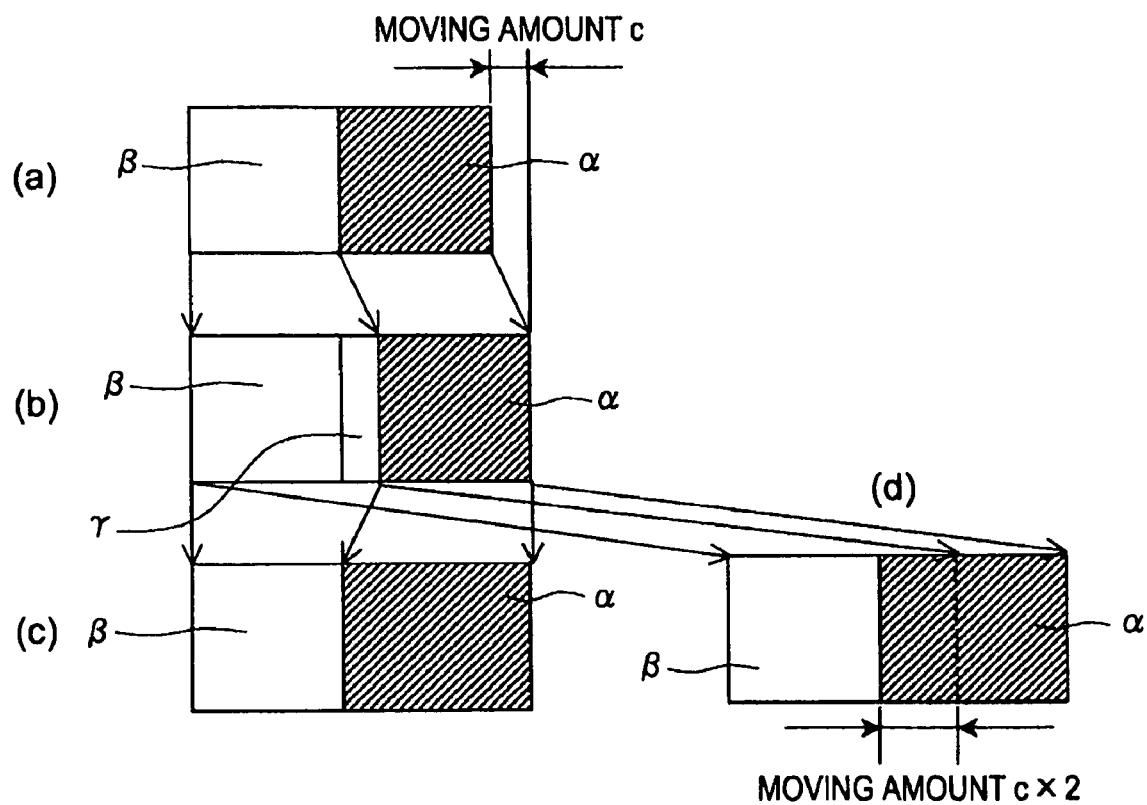
FIG. 5 is a diagram illustrating an example where a gap occurring after the subject is moved is filled.

FIG. 5 is a diagram illustrating an example where the gap occurring after the subject is moved is filled. Part (a) of FIG. 5 shows a block α generating the subject which is not yet moved and a block (that does not generate the subject image) β adjacent to the block α. Part (b) of FIG. 5 shows a gap γ which occurs when the block α generating the subject image is moved by as much as a moving amount c. When the subject is moved by as much as the moving amount c as shown in Part (b) of FIG. 5, the block generating the moved subject image is displaced from the end of the predetermined pixel unit by as much as the moving amount c and the gap γ occurs between the block α and the block β.

After moving the subject by as much as the moving amount c, the image conversion unit 7 expands the pixels generating the entire moved subject image (all of the pixels including the block α) by as much as the moving amount c so that the gap occurring due to the movement of the subject is eliminated as shown in Part (c) of FIG. 5. Otherwise, the image conversion unit 7 expands the pixels generating part of the moved subject image by as much as the moving amount c so that the gap occurring due to the movement of the subject image is eliminated as shown in Part (d) of FIG. 5. Namely, a range defined in the block α generating the subject image is copied and pasted on the above-described gap so that the gap γ is filled for display, where the range corresponds to the moving amount c and extends in the movement origin direction.

In the above-described embodiment, the distance data 203 used to determine the moving amount of the subject is generated for each of the given pixel blocks. However, according to another embodiment of the present invention, the distance may be minutely calculated for each of small blocks included in the pixel block based on the distance data 203. A method of minutely calculating the distance for each of the small blocks included in the block based on the distance data 203 of a predetermined block will be described below.

Figure 6:
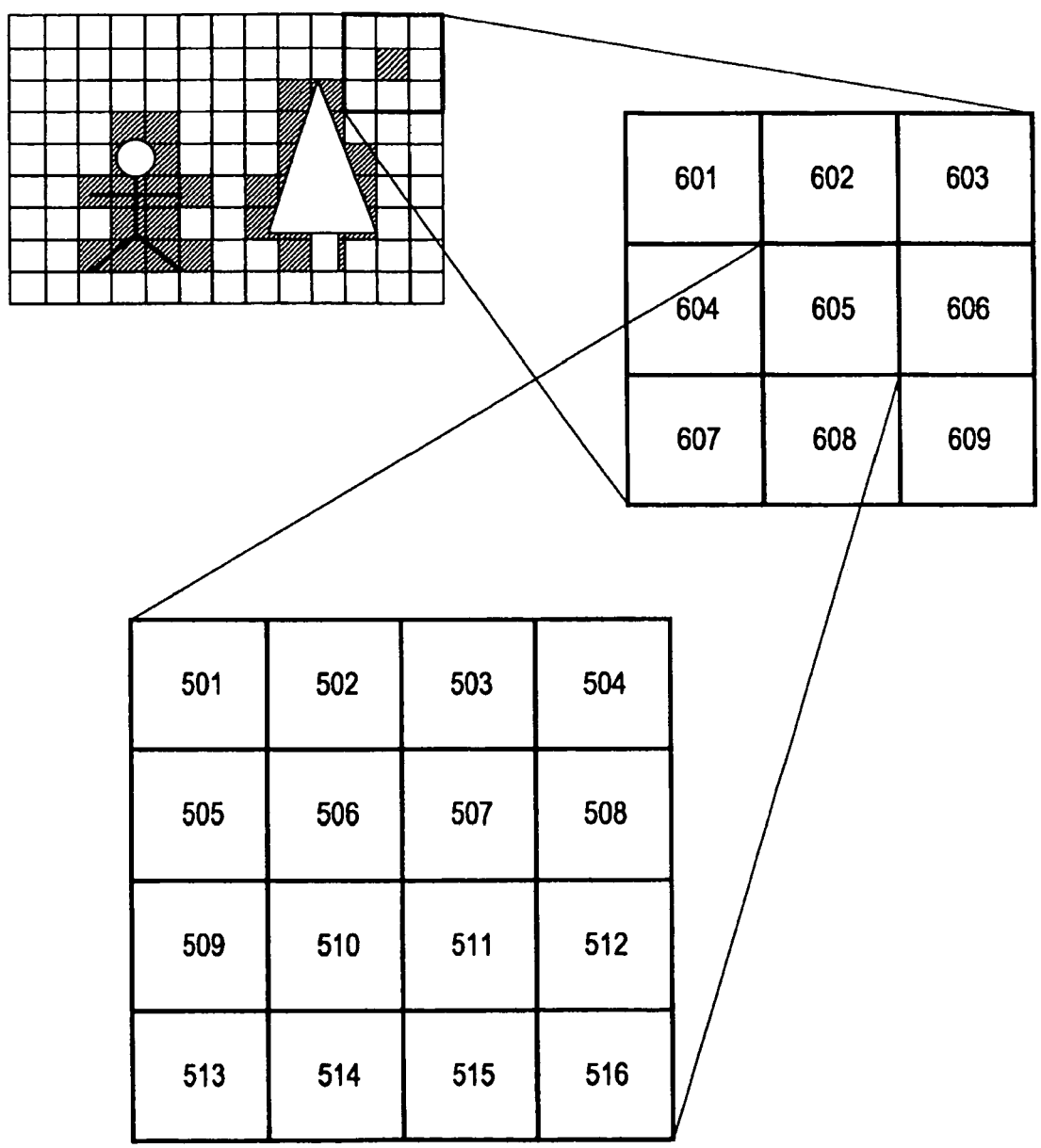
FIG. 6 is a diagram provided to illustrate an example where the distance data of each of small blocks included in a predetermined pixel block is calculated based on data of distances to the surrounding pixel blocks.

FIG. 6 is a diagram provided to illustrate an example where the distance data of each of small blocks 501 to 516 that are included in a predetermined pixel block is calculated based on the distance data 203 indicating the distances to the surrounding pixel blocks 601 to 609. Here, the small block denotes a predetermined block included in the given pixel block. In FIG. 6, for example, each of the given pixel blocks 601 to 609 is the macroblock (16 by 16 pixels) and the small block is the block (4 by 4 pixels) obtained by dividing the macroblock into sixteen pixels. Further, the number of pixels the small block should have after the given pixel block is divided is not limited in the present invention. The above-described number may be arbitrarily set according to the appropriate precision of the three-dimensional image data 205.

In FIG. 6, the minute distance data of each of the small blocks 501 to 516 is calculated based on the distance data of the predetermined pixel block including the small blocks and the surrounding blocks 601 to 609 as described below. Hereinafter, the distance data of a block n (the sign n indicates any one of the block numbers, that is, 501 to 516, or 601 to 609) is expressed as Dn.

Distance data D501 of the small block 501 is calculated as below.

$$D501=(D601\times2+D602+D604+D605\times2)/6$$

Distance data D502 of the small block 502 is calculated as below.

$$D502=(D602\times2+D601+D603+D605\times2)/6$$

Distance data D503 of the small block 503 is calculated as below.

$$D503=(D602\times2+D601+D603+D605\times2)/6$$

Distance data D504 of the small block 504 is calculated as below.

$$D504=(D603\times2+D602+D606+D605\times2)/6$$

Distance data D505 of the small block 505 is calculated as below.

$$D505=(D604\times2+D601+D607+D605\times2)/6$$

Distance data D506 of the small block 506 is calculated as below.

$$D506=D605$$

Distance data D507 of the small block 507 is calculated as below.

$$D507=D605$$

Distance data D508 of the small block 508 is calculated as below.

$$D508=(D606\times2+D603+D609+D605\times2)/6$$

Distance data D509 of the small block 509 is calculated as below.

$$D509=(D604\times2+D601+D607+D605\times2)/6$$

Distance data D510 of the small block 510 is calculated as below.

$$D510=D605$$

Distance data D511 of the small block 511 is calculated as below.

$$D511=D605$$

Distance data D512 of the small block 512 is calculated as below.

$$D512=(D606\times2+D603+D609+D605\times2)/6$$

Distance data D513 of the small block 513 is calculated as below.

$$D513=(D613\times2+D604+D608+D605\times2)/6$$

Distance data D514 of the small block 514 is calculated as below.

$$D514=(D608\times2+D607+D609+D605\times2)/6$$

Distance data D515 of the small block 515 is calculated as below.

$$D515=(D608\times2+D607+D609+D605\times2)/6$$

Distance data D516 of the small block 516 is calculated as below.

$$D516=(D609\times2+D606+D608+D605\times2)/6$$

By using the distance data of the small blocks, the distance data being calculated according to the above-described manner, it becomes possible to minutely calculate the moving amount of the subject when generating the right-eye image data 206 and the left-eye image data 207 that are included in the three-dimensional image data 205 based on the above-described multiplexed data 204.

Thus, according to the three-dimensional image generating system 100 of the above-described embodiments, the distance data 203 generated based on data of the distance to the subject, the distance being measured through the distance measuring sensor 3, is multiplexed onto the digital image data 202 generated through the shooting performed by the single image pickup unit 1 so that the multiplexed data 204 is generated. Then, the image conversion unit 7 can automatically generate data of two parallax images, that is, the right-eye image data 206 and the left-eye image data 207 based on data of a single two-dimensional image, as the three-dimensional image data 205, based on the multiplexed data 204. Namely, the three-dimensional image generating system 100 of the above-described embodiments allows for generating three-dimensional image data based on data of a single two-dimensional image, the data being obtained through a single image-pickup unit, automatically and easily.

Further, according to the three-dimensional image generating system 100, the distance measurement is performed for each of the given pixel blocks (e.g., the macroblocks) of the digital image data 202 generated through the image compression unit 202 compressing the image data 201 obtained through the shooting performed by the image pickup unit 1. Still further, the image conversion unit 7 generates the three-dimensional image in the given pixel blocks. Therefore, the processing load occurring during the distance measurement is decreased, and the management of the distance data 203 and/or the generation of the three-dimensional image becomes easy. Further, since it becomes possible to divide the given pixel block into the small blocks, calculate the distance data 203 for each of the small blocks, and generate the three-dimensional image in the small blocks based on the calculated distance data 203. Consequently, it becomes also possible to generate the three-dimensional image data 205 with higher precision.

The present application contains subject matter related to that disclosed in Japanese Priority Patent Application JP 2008-147354 filed in the Japan Patent Office on Jun. 4, 2008, the entire content of which is hereby incorporated by reference.

The present invention is not limited to the above-described embodiments. Namely, for implementing the present invention, the components of the above-described embodiments may be modified in various ways and replaced with various components within the technical scope and/or the scope equivalent thereto of the present invention. It should be understood by those skilled in the art that various modifications, combinations, sub-combinations and alterations may occur depending on design requirements and other factors insofar as they are within the scope of the appended claims or the equivalents thereof.

What is claimed is:

1. An image encoding device comprising:
   a single image pickup unit configured to generate image data by shooting at least one subject;
   an image compression unit configured to generate digital image data by compressing the generated image data;
   a distance measuring unit configured to measure a distance to the subject when the image pickup unit performs the shooting;
   a multiplexing unit configured to generate multiplexed data based on the digital image data and the measured distance by appending, in a header part of the digital image data, distance data indicating a distance to a subject of each of given pixel blocks of the digital image data to the digital image data; and
   an image conversion unit configured to generate right-eye image data and left-eye image data in accordance with a parallax occurring at a viewpoint defined during the shooting by horizontally moving each subject data included in the digital image data in a right direction and a left direction based on the distance data obtained for each of the given pixel blocks by using the generated multiplexed data.

2. The image encoding device according to claim 1, wherein the image conversion unit calculates an amount of the movement of the each subject in the right direction and the left direction based on data of a distance to a background of the digital image data and data of a distance to the subject.

3. An image encoding method comprising the steps of:
   generating image data by shooting at least one subject by using a single image pickup unit;
   generating digital image data by compressing the generated image data;
   measuring a distance to the subject when the image pickup unit performs the shooting at the image-data generating step;
   appending, in a header part of the digital image data, distance data indicating a distance to a subject of each of given pixel blocks of the digital image data to the digital image data based on the digital image data encoded and generated at the digital-image-data generating step and the distance measured at the measuring step; and
   generating right-eye image data and left-eye image data in accordance with a parallax occurring at a viewpoint defined during the shooting by horizontally moving each subject data included in the digital image data in a right direction and a left direction based on the appended distance data obtained for each of the given pixel blocks.

* * * * *